US009975429B2

(12) United States Patent
Chen et al.

(10) Patent No.: US 9,975,429 B2
(45) Date of Patent: May 22, 2018

(54) CONTEXTUAL NOTIFICATION PRESENTATION IN A TRANSPORTATION APPARATUS

(71) Applicant: THUNDER POWER NEW ENERGY VEHICLE DEVELOPMENT COMPANY LIMITED, Central (HK)

(72) Inventors: Yong-Syuan Chen, New Taipei (TW); Jen-Chieh Hsiao, Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days. days.

(21) Appl. No.: 15/190,402

(22) Filed: Jun. 23, 2016

(65) Prior Publication Data

US 2017/0072798 A1 Mar. 16, 2017

Related U.S. Application Data

(60) Provisional application No. 62/218,580, filed on Sep. 15, 2015.

(51) Int. Cl.
*B60Q 1/00* (2006.01)
*B60K 35/00* (2006.01)
(Continued)

(52) U.S. Cl.
CPC ............ *B60K 35/00* (2013.01); *B60W 40/00* (2013.01); *B60W 50/14* (2013.01); *G06F 3/00* (2013.01);
(Continued)

(58) Field of Classification Search
CPC ...... B60K 2350/106; B60K 2350/1084; B60K 2350/1096; B60K 2350/2008;
(Continued)

(56) References Cited

U.S. PATENT DOCUMENTS

2008/0004793 A1 1/2008 Horvitz et al.
2008/0042814 A1 2/2008 Hurwitz et al.
(Continued)

FOREIGN PATENT DOCUMENTS

CN 103544844 A 1/2014

OTHER PUBLICATIONS

European Search Report for 16186075 dated Feb. 16, 2017, 9 pages.

*Primary Examiner* — Ojiako Nwugo
(74) *Attorney, Agent, or Firm* — Kilpatrick Townsend & Stockton LLP

(57) ABSTRACT

Contextual presentation of notifications within a transportation apparatus is disclosed. Driving information related to the driving of the transportation apparatus may be received. In some examples, the driving information includes speed, traffic, road condition, and/or environment condition information. Based on such driving information, a determination may be made with respect to presentation of a notification within the apparatus. For example, the notification may be determined not to be presented based on the driving information. In some examples, the determination may also include determining a format in which the notification will be presented within the transportation apparatus. In some examples, the format may include font size, color, type, blinking frequency, location on a dashboard screen and/or any other format information for presenting the notification within the transportation apparatus.

18 Claims, 9 Drawing Sheets

(51) Int. Cl.
*B60W 50/14* (2012.01)
*B60W 40/00* (2006.01)
*G06F 3/00* (2006.01)
*G08G 1/0962* (2006.01)
*G08B 5/36* (2006.01)
*G08B 21/24* (2006.01)

(52) U.S. Cl.
CPC .............. *G08B 5/36* (2013.01); *G08B 21/24* (2013.01); *G08G 1/0962* (2013.01); *B60K 2350/106* (2013.01); *B60K 2350/1084* (2013.01); *B60K 2350/1096* (2013.01); *B60K 2350/2008* (2013.01); *B60K 2350/352* (2013.01); *B60K 2350/962* (2013.01); *B60K 2350/965* (2013.01); *B60K 2350/967* (2013.01)

(58) Field of Classification Search
CPC ........ B60K 2350/352; B60K 2350/962; B60K 2350/965; B60K 2350/967; B60K 35/00; B60W 40/00; B60W 50/14; F01D 19/02; F01D 21/12; G01J 5/0022; G01J 5/0088; G01J 5/0806; G01J 5/0821; G01J 5/089; G06F 3/00; G08B 21/24; G08B 5/36; G08G 1/0962

USPC .......... 340/461, 438, 459; 701/1, 29.1, 31.7, 701/33.2, 50, 117, 301
See application file for complete search history.

(56) References Cited

U.S. PATENT DOCUMENTS

| | | | |
|---|---|---|---|
| 2011/0126119 A1* | 5/2011 | Young | G06F 17/30905 715/744 |
| 2013/0342365 A1 | 12/2013 | Kiefer et al. | |
| 2014/0278105 A1* | 9/2014 | Canfield | G01C 21/3423 701/538 |
| 2014/0280657 A1* | 9/2014 | Miller | H04L 51/26 709/207 |
| 2014/0300739 A1* | 10/2014 | Mimar | H04N 7/188 348/148 |
| 2015/0199162 A1 | 7/2015 | Platz et al. | |
| 2015/0363748 A1* | 12/2015 | Beaurepaire | G06Q 10/1095 705/7.19 |
| 2016/0205267 A1* | 7/2016 | Vaughn | H04M 19/04 455/566 |
| 2016/0249319 A1* | 8/2016 | Dotan-Cohen | H04M 3/42365 |

* cited by examiner

CONTEXTUAL NOTIFICATION PRESENTATION IN A TRANSPORTATION APPARATUS

CROSS-REFERENCE TO RELATED APPLICATION

This application is a nonprovisional of and claims priority to U.S. Pat. App. No. 62/218,580, filed Sep. 15, 2015, entitled CONTEXTUAL NOTIFICATION PRESENTATION IN A TRANSPORTATION APPARATUS, which is incorporated herein by reference.

FIELD OF THE INVENTION

The invention generally relates to presenting notifications in a transportation apparatus.

BACKGROUND OF THE INVENTION

Notification presentation on a computing device is generally known in the art. Typically, a notification may be presented to a user visually or audibly as soon as the content of the notification is received or generated by the computing device. Some systems allow the user to configure the notifications to be presented.

Developments in liquid crystal display (LCD) technology have made free-form display on a dashboard a reality. Equipped with the new free-form display technology, a dashboard screen can be snipped and shaped to fit virtually any layout design on a dashboard and to fill the entire surface area of the dashboard. The free-form display's flexibility makes it possible to integrate every necessary monitor or gauge, from speedometer to odometer, into a single instrument panel.

SUMMARY OF THE INVENTION

In accordance with one aspect of the invention, contextual presentation of notifications within a transportation apparatus is disclosed. Notifications may be presented within the transportation apparatus based on driving information related to the transportation apparatus. For example, such driving information may include speed, traffic, road, environment and/or any other driving information related to the transportation apparatus. In some embodiments, the notifications are categorized into corresponding notification types. In those embodiments, presentation of the notifications within the transportation apparatus may be based on the notification types and the driving information. In those embodiments, notifications of some notification types may not be presented within the transportation apparatus based on the current driving information, and notification of some notification types may be required to be presented within the transportation apparatus based on the driving information.

For instance, when the driving information indicating transportation apparatus is travelling fast than a threshold speed, notifications regarding communication received by the transportation apparatus may not be presented within the transportation apparatus for the safety of the user(s) of the transportation apparatus; however, notifications regarding driving condition such as road condition or speed limit of a road being traveled on by the transportation apparatus may be required to be presented to the user(s) of the transportation apparatus for safety. In some implementations, the presentation of contextual notifications within the transportation apparatus may involve presenting the contextual notifications graphically and digitally on one or more information panels of the transportation apparatus. In some implementations, the presentation of the contextual notifications within the transportation apparatus may involve presenting the contextual notifications audibly within the transportation apparatus.

In some examples, presentation format of the contextual notifications may be further determined. For example, font size, color, blinking frequency, volume and/or any other aspects of the notification presentation within the transportation apparatus may be determined.

Other objects and advantages of the invention will be apparent to those skilled in the art based on the following drawings and detailed description.

DETAILED DESCRIPTION

Figure 1:
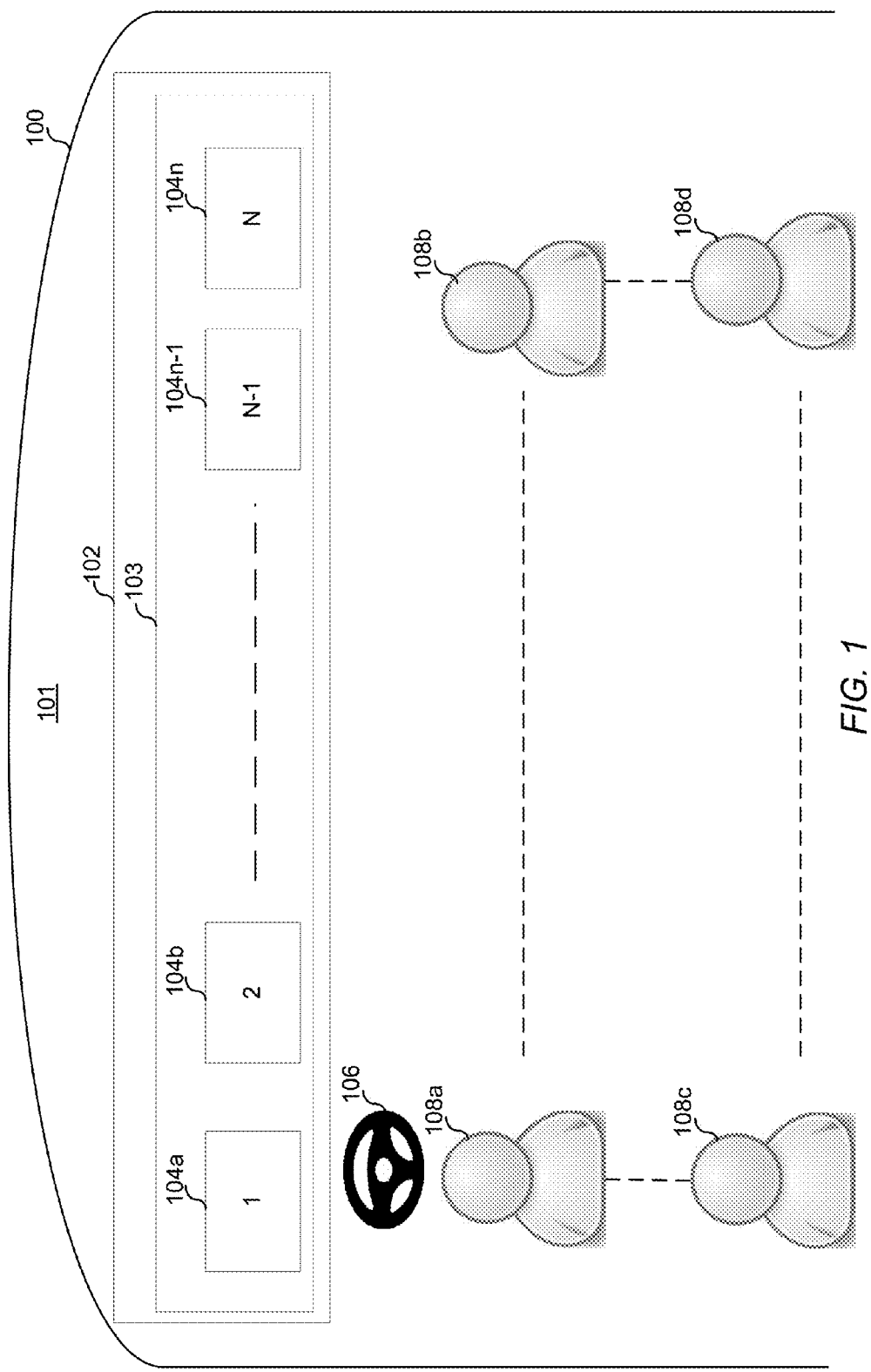
FIG. 1 generally illustrates an embodiment of information panels, capable of presenting notifications, on a dashboard screen in a transportation apparatus.

FIG. 1 generally illustrates an embodiment of information panels 104 displayed on a screen 103 of a dashboard 102 in a transportation apparatus 100. The transportation apparatus 100 may include any apparatus that moves in distance. Examples of transportation apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a spaceship, or any other type of aircraft; or may include any other transportation apparatus. In one example, the transportation apparatus 100 is an electrical automobile. As shown, the transportation apparatus 100 may include a cabin 101 with a volume.

As shown in FIG. 1, in the cabin 101, there may be a dashboard 102 that has a screen 103. Although in this example, a dashboard screen 103 occupies the entire surface of the dashboard 102, this is not intended to be limiting. It is contemplated that in some cases, the dashboard screen 103 may occupy a portion of the dashboard 102 instead of the entire dashboard 102. In any case, the dashboard screen 103 is suitable to display one or more information panels, such as the information panels 104 shown in FIG. 1. In implementations, the dashboard screen 103 may include any display technology, such as liquid-crystal display (LCD), crystal LCD, light-emitting diode (LED), organic light-emitting diode (OLED), active-matrix organic light-emitting diode (AMOLED), Plasma, projection panel, cathode ray tube (CRT), and/or any other display technology. As also shown, the information panels 104 displayed on the dashboard screen 103 are separate and independent from each other such that the individual information panels 104 are displayed at corresponding positions on the dashboard screen 103. In this example, information panel 104a is displayed at position 1 on the dashboard screen 103, information panel 104b is displayed at position 2 on the dashboard screen 103, information panel 104n–1 is displayed at position N–1 on the dashboard screen 103, and information panel 104n is displayed at position N on the dashboard screen 103.

In some examples, information presented in the information panels 104 may include gauge information related to the transportation apparatus 100, such as current speed/altitude/direction/wind, current longitude/latitude, distance traveled, RPM, fuel level, battery level, and/or any other gauge information related to the transportation apparatus 100. In some examples, information presented in the information panels 104 may include indication information, such as seat belt, airbag, door, trunk, maintenance, safety, window lock, door lock indication information or any other indication information. In some examples, information presented in the information panels 104 may include navigational or GPS information related to navigation of the transportation apparatus 100, such as current street traveled on, map of an area the transportation apparatus 100 is traveling in, the destination information, direction instructions, traffic condition, estimated arrival time, estimated delay due to traffic, and/or any other navigation information. In some examples, information presented in the information panels 104 may include cabin information, such as current temperature, humidity, wind speed, number of passengers in one or more zones in the cabin 101 and/or any other cabin information. In some examples, information presented in the information panels 104 may include configuration information regarding the transportation apparatus 100, such as seat configuration, mirror configuration, battery configuration, driving mode configuration, and/or any other configuration. In some examples, information presented in the information panels 104 may include entertainment information. For example, such an information panel may include a video screen capable of presenting a video or still images, a browser screen capable of presenting web information, a game screen capable of presenting one or more games for user interaction, a music information screen capable of enabling a user to consume music pieces, e-commerce information screen capable of enabling a user to engage remote transaction via the Internet, radio information screen capable of presenting a list of radio stations available for user consumption, and/or any other type of infotainment screen. In some examples, information presented in the information panels 104 may include notification information such as incoming call, incoming text message, incoming video chat request, and/or any other notification information. Other examples of information panels 104 are contemplated.

As still shown in FIG. 1, the transportation apparatus 100 may comprise one or more steering wheels 106 in the cabin 101. Although only one steering wheel 106 is shown in FIG. 1, this is not intended to be limiting. In some examples, the transportation apparatus 100 may include more than one steering wheel 106. For example, it is contemplated that the transportation apparatus 100 may be an aircraft that comprises at least a main steering wheel 106 for the main pilot and at least a secondary steering wheel 106 for a co-polit.

As also shown in FIG. 1, one or more users 108 may be arranged to occupy their corresponding positions in the cabin 101. The users 108 may include one or more drivers that control the movement or navigation of the transportation apparatus 100, one or more passengers, and/or any other type of users 108. In this example, the user 108a is a driver that controls the driving of the transportation apparatus 100, while other users 108, e.g., users 108b-d, are passengers. As still shown, there may be multiple rows of users 108 within the cabin 101 of the transportation apparatus 100.

Figure 2:
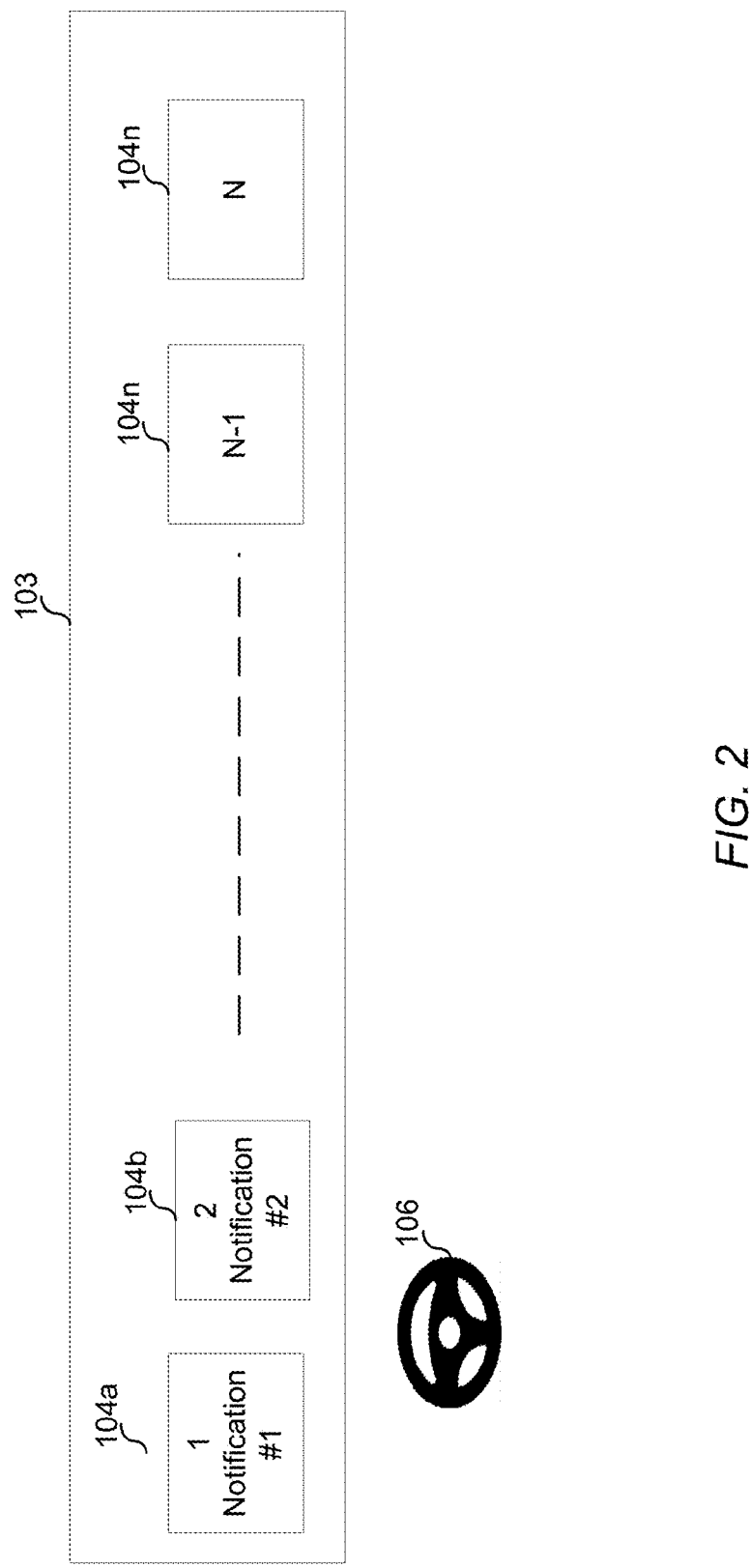
FIG. 2 illustrates some examples of information panels on a dashboard for presenting the contextual notifications within a transportation apparatus.
Figure 3:
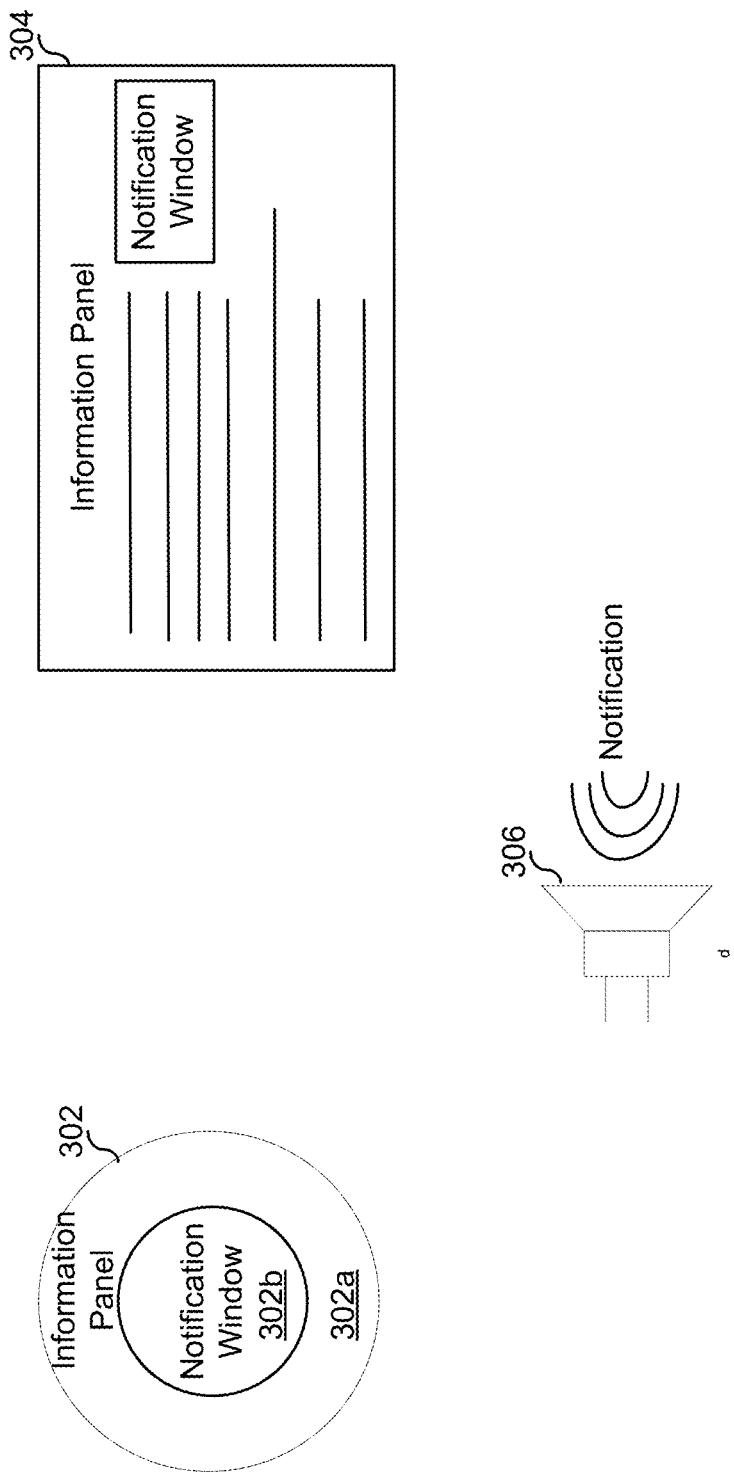
FIG. 3 illustrates some examples of presenting the contextual notifications within a transportation apparatus.

With the arrangement of information panels 104 within the cabin 101 of transportation apparatus 100 having been generally described, attention is now directed to FIGS. 2-3. FIG. 2 illustrates some example of information panels 104 displayed on the dashboard screen 103 as shown in FIG. 1. As shown, the information panel 104a that presents speed, distance, battery and/or any other driving information regarding the transportation apparatus 100 may be displayed at position 1 on the dashboard screen 103. The display of the information panel 104a at position 1 may facilitate the driver(s) to acquire driving information to make appropriate driving decisions, since position 1 is located on the driver's side of dashboard screen 103. As also shown, notification(s) may be presented in information panel 104a based on the driving information. As used herein, notifications presented based on the driving information related to the transportation apparatus 100 may be referred to as contextual notifications. That is, presentation, content, format and/or any other aspects of such notifications may change based on the driving information related to the transportation apparatus 100.

For example, without limitation, the notifications presented in the information panel 104 may be contextual based on the driving information. For instance, if the transportation apparatus 100 travels over a threshold speed (e.g., 70 km/hour), contextual notifications of road conditions (e.g., information regarding accident(s) within 5 km from the current location of the transportation apparatus 100) may be presented on the information panel 104a in red color to serve as a conspicuous warning to the driver(s) of the transportation apparatus 100 that the driver(s) shall slow down immediately. In contrast, if the transportation apparatus 100 travels below the speed limit, such contextual notifications may be presented on the information panel 104a in regular white color to serve as a forecast to the driver(s) that the driver(s) shall be prepared to slow down soon.

As another example, without limitation, when the driving information indicating transportation apparatus 100 is travelling fast than a threshold speed, notifications regarding communication received by the transportation apparatus may not be presented within the transportation apparatus for the safety of the user(s) of the transportation apparatus. In some implementations, the presentation of contextual notifications within the transportation apparatus 100 may involve presenting the contextual notifications graphically and digitally on one or more information panels of the transportation apparatus. In some implementations, the presentation of the contextual notifications within the transportation apparatus may involve presenting the contextual notifications audibly within the transportation apparatus.

As also shown, the information panel 104b that presents navigation information may be displayed at position 2 on the dashboard screen 103. As described above, the navigation information presented by information panel 104b may include graphical map indicating an area within which the transportation apparatus 100 is currently traveling, and as well as other navigation information such as direction, estimated arrival time, traffic condition, and/or any other navigation information. The display of the information panel 104b at position 2 may facilitate the driver(s) to acquire navigation information to make appropriate driving decisions, since position 2 is located on the driver's side of dashboard screen 103. As also shown, contextual notification(s) may be presented in information panel 104b based on the driving information. For instance, if the transportation apparatus 100 travels within a traffic condition, notifications of (e.g., infotainment such as information regarding artists being currently played on a music playing device of the transportation apparatus 100), may not be presented on the information panel so not to distract the driver(s) of the transportation apparatus 100 while in traffic. In contrast, if the transportation apparatus 100 is not traveling in traffic and is traveling below a threshold speed, such notifications may presented on the information panel 104b for display to the user(s) of the transportation apparatus 100.

As also shown in this example, some information panels 104, such as information panels 104n-1 and 104n as shown, may not present notifications for display to the driver(s) of the transportation apparatus 100. As should be clear, although display of the contextual notifications is illustrated, this is not intended to be limited. In some examples, the presentation of the contextual notifications may include other forms, such as audible presentation. For example, the contextual notifications may be announced by the transportation apparatus 100 to the user(s) of the transportation apparatus 100.

FIG. 3 illustrates some examples of presenting the contextual notifications within a transportation apparatus 100. Information panel 302 shown in FIG. 3 is a round display that may be presented on the dashboard screen 103 shown in FIG. 1. As shown, contextual notification(s) may be presented in an inner circle notification window 302b within the display area 302a of the information panel 302. Information panel 304 shown in FIG. 3 is a rectangular display that may be presented on the dashboard screen 103 shown in FIG. 1. As shown, contextual notification(s) may be presented in a notification window within the information panel 304. Speaker 306 shown in FIG. 3 is another example for presenting the contextual notifications. That is the contextual notifications may be presented through speaker 306.

Figure 4:
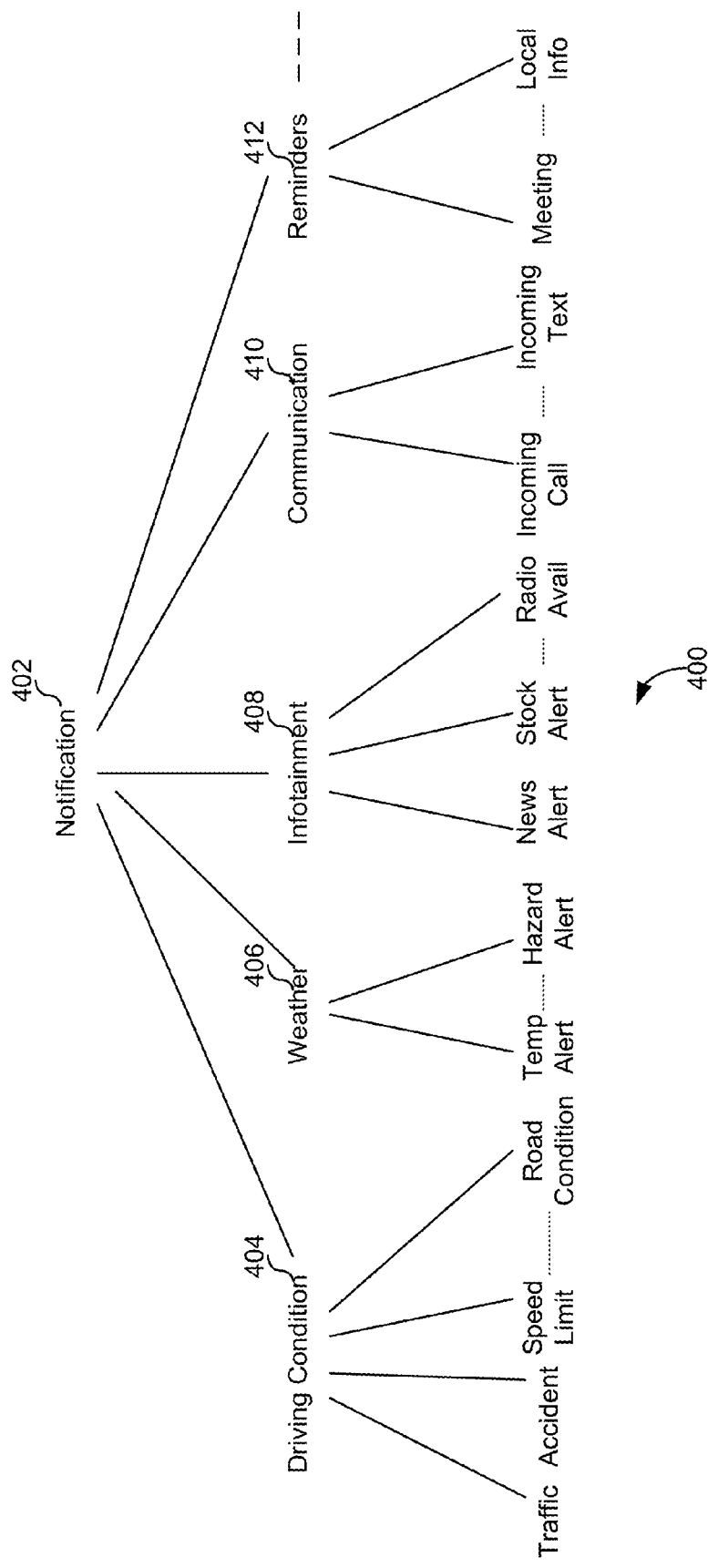
FIG. 4 illustrates one example of notification types of which notifications may be presented within a transportation apparatus.

FIG. 4 illustrates an exemplary classification of notification types based on which contextual notifications may be presented within transportation apparatus 100. As shown, notifications that may be presented within the transportation apparatus 100 may be organized as a classification 400. At a root 402 of the classification 400, types of the notifications may be categorized. As shown, the notification types may include a driving condition type 404, which may categorize notifications regarding driving conditions related to transportation apparatus 100. As also shown, under the notification type 404, traffic, accident, speed limit, road condition and any other notifications may be classified. A traffic notification may include information regarding current traffic of an area or a route the transportation apparatus 100 is traveling in. For instance, without limitation, it may simply include information indicating whether a specific route is congested or not.

An accident notification may include information indicating one or more accidents within a distance from the transportation apparatus 100. For instance, without limitation, it may include information indicating an accident has happened on the route and is in certain distance away from transportation apparatus 100. A speed limit notification may include information indicating a speed limit on a road the transportation apparatus 100 is travelling in. For instance, it may include information indicating that the speed limit of a road the transportation apparatus 100 is traveling in is at 45 km/hour. A road condition notification may include information indicating a condition of the road. For instance, it may include information indicating that the road the transportation apparatus 100 is traveling in has a sharp turn, or has an entrance from a side road some distance away, or any other road condition information.

As also shown, the notification classification 400 may include a weather notification type 406. The weather notification type may categorize a temperature alert notification, an environment hazard notification, a weather condition notification, and/or any other weather notifications. The temperature alert notification may include information indicating an ambient temperature (inside or outside transportation apparatus 100) is above a temperature limit. Such a notification may serve as a warning to the user(s) of the transportation apparatus 100. The hazard alert may include information indicating one or more environment hazards are present or will be present. For instance, without limitation, it may include information indicating that a flood is expected to take place within the 24 hours; that a tree has fallen down 4 km ahead, and/or any other hazard information.

As still shown, the notification classification 400 may include an infotainment notification type 406. The infotainment notification type 408 may categorize a news alert notification, a stock notification, an radio station available notification, and/or any other notification that may be presented within transportation apparatus 100. The news alert and stock alert are self-explanatory. The radio station(s) available in an area via transportation apparatus 100 may be presented to user(s) of the transportation apparatus 100.

As yet shown, the notification classification 400 may include a communication notification type 410. The communication notification type 410 may categorize various communication related notifications. As shown, such notifications may include information indicating an incoming call, an incoming text message, a voice call and/or any other communication notification type.

As yet shown, the notification classification may categorize various reminders, which may include meeting reminders, local information reminders and/or any other notifications. The local information reminders may include information regarding one or more local attractions (e.g., scenery spot(s), gas station(s), grocery store(s), drug store(s)) that may be presented to the user(s) of the transportation apparatus 100.

The examples of notification types 404, 406, 408, 410, and 412 are not intended to be limiting, and other examples of notification types are contemplated.

Figure 5:
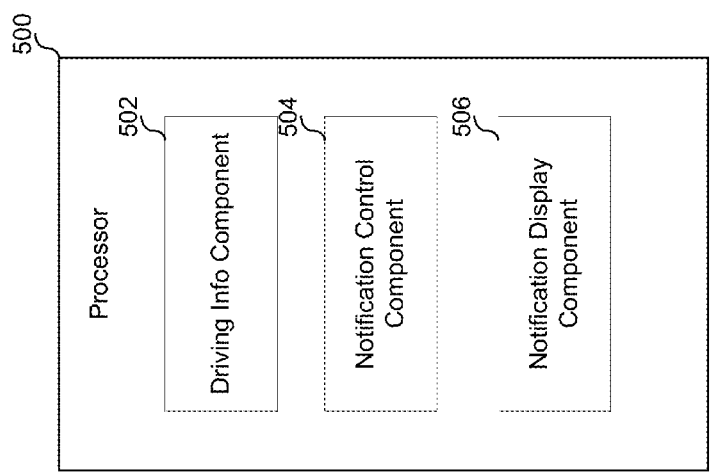
FIG. 5 generally illustrates a block diagram of a processor configured to contextually present notifications within a transportation apparatus in accordance with one embodiment of the disclosure.
Figure 6:
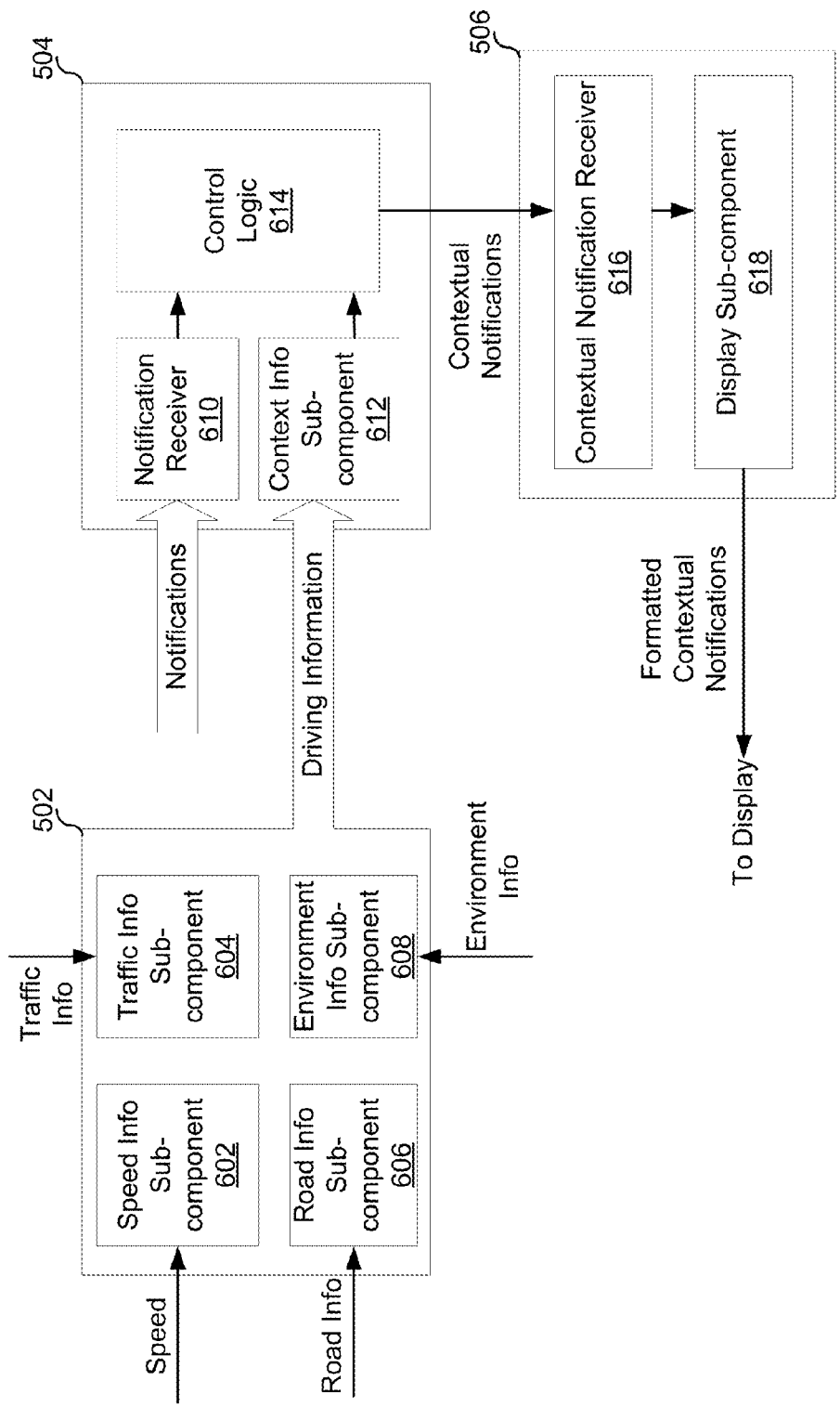
FIG. 6 illustrates one example of the components shown in FIG. 5.

Attention is now directed to FIGS. 5-6, where exemplary implementations of the present disclosure is described. FIG. 5 generally illustrates a block diagram of a processor configured to contextually present notifications within a transportation apparatus in accordance with one embodiment of the disclosure. As shown, a processor 500 may be included in the transportation apparatus 100. In some examples, the processor 500 is an electronic control unit of the transportation apparatus 100. As shown, in some example, as in this example, the processor 500 comprises a driving information component 502, a notification control component 504, a notification display component 506 and any other components (if any). The driving information component 502 may be configured to receive driving information related to the transportation apparatus 100. The driving information received by the driving information component 502 may indicate various aspects related to the driving of the transportation apparatus 100, such as traffic condition, speed of the transportation apparatus 100, environment information, and/or any other driving information related to transportation apparatus 100. The notification control component 504 may be configured to receive notifications, determine if the received notifications may be presented within the transportation apparatus 100 based on the driving information, and to perform any other operation(s) (if any). The notification display component 506 may be configured to determine presentation of the contextual notifications determined by the notification control component 504, effectuate presentation of the contextual notifications, and to perform any other operation(s) (if any).

FIG. 6 illustrates one example of the components shown in FIG. 5. It will be described with reference to FIG. 1 and FIG. 5. As shown, driving information component 502, in this example, comprises a speed information sub-component 602, a traffic information sub-component 604, a road information sub-component 606, an environment information sub-component 608, and any other components (if any). The speed information sub-component 602 may be configured to receive speed information regarding a speed of the transportation apparatus 100. For example, the speed information received by the speed information sub-component 602 may indicate a current speed at which the transportation apparatus 100 is traveling at. The traffic information sub-component 604 may be configured to receive traffic information regarding one or more traffic conditions. For example, the traffic information received by the traffic information sub-component 604 may indicate a traffic condition (e.g., average speed of other transportation apparatus) on a route the transportation apparatus 100 is traveling in. The road information sub-component 606 may be configured to receive road information regarding one or more roads the transportation apparatus 100 is or will be traveling in. For example, the road information received by the road information sub-component 606 may indicate that sharp turn is coming up within next 2 miles on the road; may indicate that an entrance to the road is coming up within the next 1 mile; may indicate that a stop sign is ahead; and/or any other road information. The environment information sub-component 608 may be configured to receive environment information regarding an environment the transportation apparatus 100 is traveling in or will be traveling in. For example, the environment information received by the environment information sub-component 608 may indicate a temperature in the environment, one or more hazards in the environment (e.g., tree fallen down, flood situation, strong wind, etc.), and/or any other environment information. As shown, all of such driving information received by components 602, 604, 606, and 608 may be transmitted to the notification control component 504 for further processing.

The notification control component 504, in this example, comprises a notification receiver 610, a context information sub-component 612, control logic 614 and any other components (if any). The notification receiver 610 may be configured to receive various notifications for presentation within the transportation apparatus 100. FIG. 4 describes some examples of the notifications that may be received by the notification receiver 610. The context information sub-component 612 may be configured to receive the driving information transmitted from the driving information component 502. The control logic may be configured to determine whether a notification received by the notification receiver 610 should be presented within the transportation apparatus 100 based on the driving information received by the context information sub-component 612. The notifications that are determined as the notifications that should be presented within the transportation apparatus 100 by the control logic 614 are referred to as contextual notifications. Examples of methods that may be configured into notification control component 504 are described in FIGS. 7-9.

The notification display component 506, in this example, comprises a contextual notification receiver 616, the display sub-component 618, and any other components (if any). The contextual notification receiver 616 may be configured to receive the contextual notifications transmitted by the notification control component 504. The display sub-component 618 may be configured to determine a presentation for the received contextual notification, e.g., specific information panel(s) for presenting the contextual notifications, font/color/size of the content of the contextual notifications, blinking or not, blinking frequency, volume level for presenting the contextual notifications, and/or any other presentation aspects. As shown, the formatted contextual notifications by the display-subcomponent may be output to a display.

Figure 7:
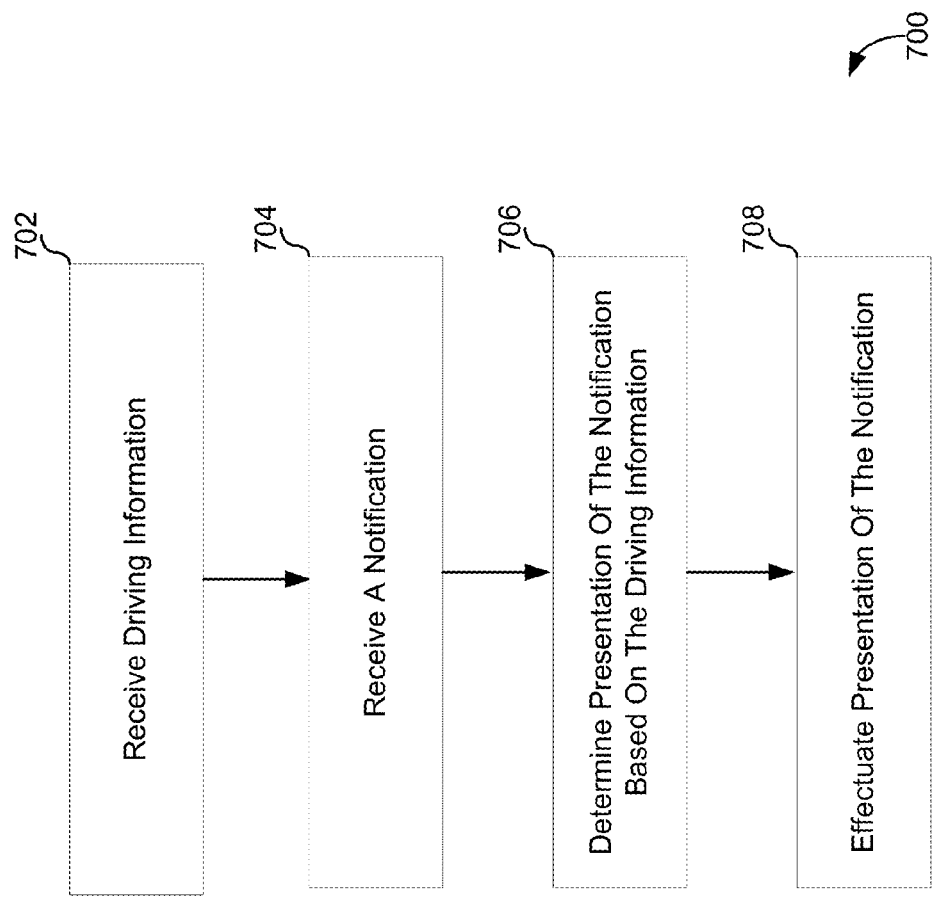
FIG. 7 illustrates one exemplary method for effecting contextual notifications within a transportation apparatus in accordance with the disclosure.

FIG. 7 illustrates one exemplary method for effecting contextual notifications within a transportation apparatus in accordance with the disclosure. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, driving information related to a transportation apparatus may be received. In some implementations, operation 702 may be performed by a driving information component the same as or substantially similar to the driving information component 502 described and illustrated herein.

At an operation 704, a notification may be received. In some implementations, operation 702 may be performed by a notification control component the same as or substantially similar to the notification control component 504 described and illustrated herein.

At an operation 706, presentation of the notification may be determined based on the driving information received at operation 702. The presentation determination at operation 706 may include determining whether the notification should be presented, the format in which the notification should presented, the information panels and/or speakers within the transportation apparatus that will be used to present the notification. In some implementations, operation 706 may be performed by a notification control component the same as or substantially similar to the notification control component 504 described and illustrated herein.

At an operation 708, presentation of the notification—i.e., the contextual notification as determined at operation 706—may be effectuated. In some implementations, operation 706 may be performed by a notification control component the same as or substantially similar to notification display component 506 described and illustrated herein.

Figure 8:
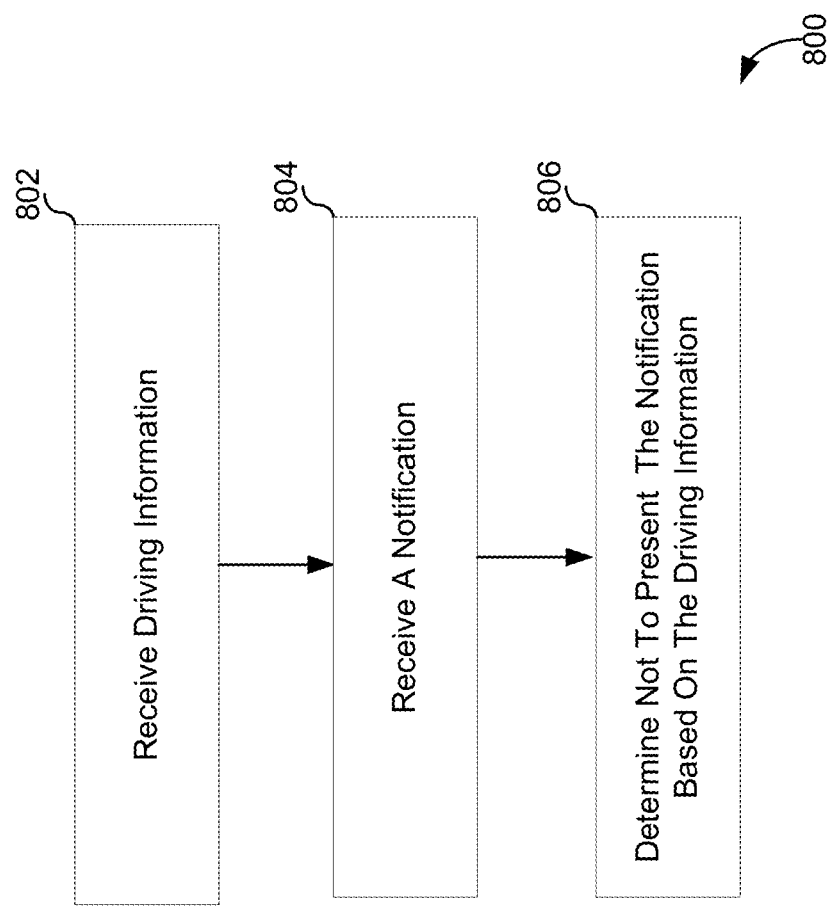
FIG. 8 illustrates another exemplary method for effecting contextual notifications within a transportation apparatus in accordance with the disclosure.

FIG. 8 illustrates another exemplary method for effecting contextual notifications within a transportation apparatus in accordance with the disclosure. The operations of method 800 presented below are intended to be illustrative. In some embodiments, method 800 may be accomplished with one or more additional operations not described and/or without one or more of the operations discussed. Additionally, the order in which the operations of method 800 are illustrated in FIG. 8 and described below is not intended to be limiting.

In some embodiments, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, driving information related to a transportation apparatus may be received. In some implementations, operation 802 may be performed by a driving information component the same as or substantially similar to the driving information component 502 described and illustrated herein.

At an operation 804, a notification may be received. In some implementations, operation 802 may be performed by a notification control component the same as or substantially similar to the notification control component 504 described and illustrated herein.

At an operation 806, the notification receive at operation 802 may be determined not to be presented within the transportation apparatus. For example, the received driving information may indicating that the transportation apparatus is traveling over a speed limit, and there is traffic 2 km ahead of the transportation apparatus, and thus the notification received at 802 may not be presented to the user(s) of the transportation apparatus 100 for safety.

Figure 9:
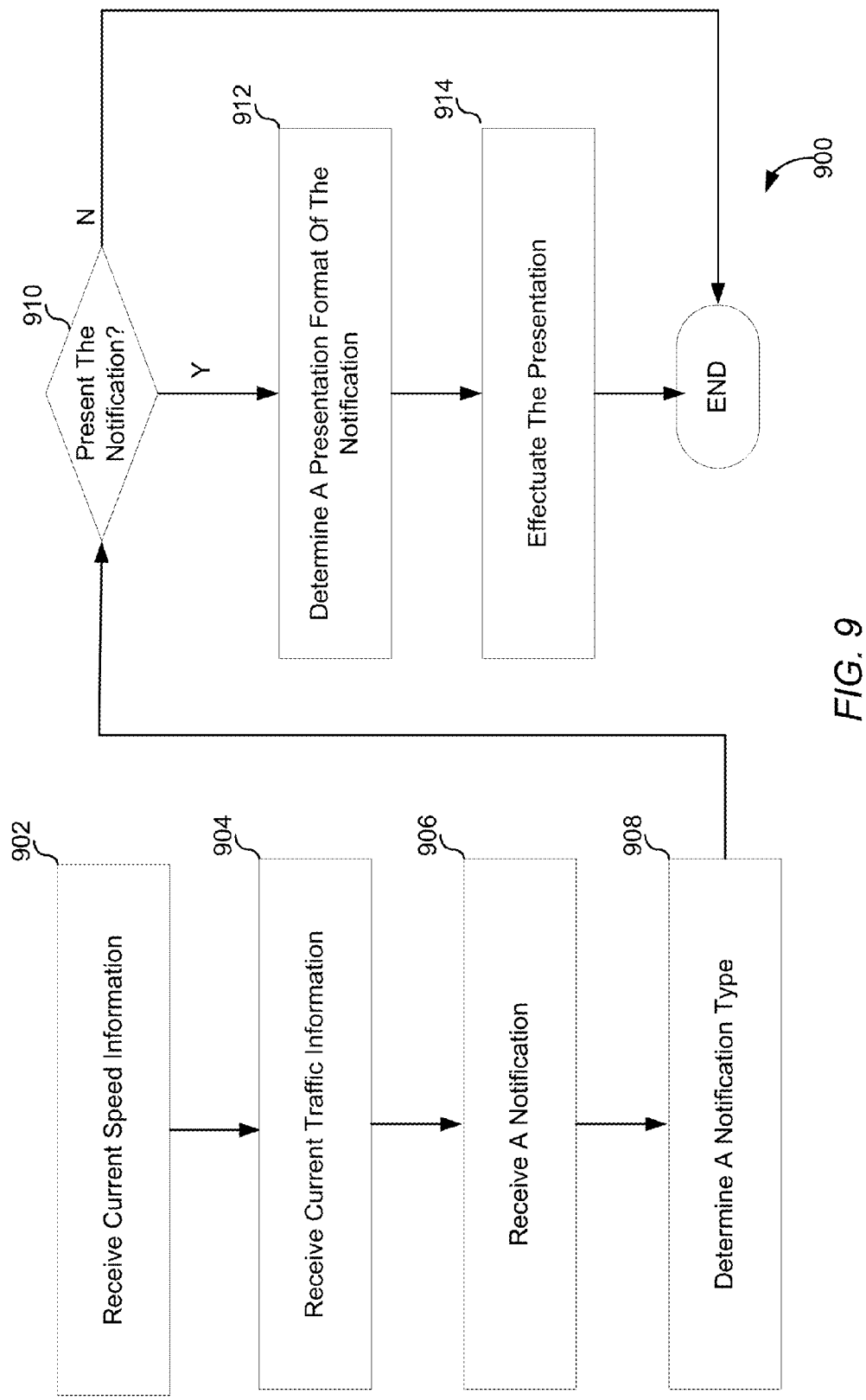
FIG. 9 illustrates still another exemplary method for effecting contextual notifications within a transportation apparatus in accordance with the disclosure.

FIG. 9 illustrates another exemplary method for effecting contextual notifications within a transportation apparatus in accordance with the disclosure. The operations of method 900 presented below are intended to be illustrative. In some embodiments, method 900 may be accomplished with one or more additional operations not described and/or without one or more of the operations discussed. Additionally, the order in which the operations of method 900 are illustrated in FIG. 9 and described below is not intended to be limiting.

In some embodiments, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At an operation 902 and 904, current speed information and traffic condition related to a transportation apparatus may be received, respectively. In some implementations, operation 902 may be performed by a driving information component the same as or substantially similar to the driving information component 502 described and illustrated herein.

At an operation 906, a notification may be received. In some implementations, operation 906 may be performed by a notification control component the same as or substantially similar to the notification control component 504 described and illustrated herein.

At an operation 908, a notification type associated with the notification received at operation 908 may be determined. In some implementations, operation 908 may be performed by a notification control component the same as or substantially similar to the notification control component 504 described and illustrated herein At a decision box 910, a determination whether the notification may be presented as a contextual information may be made. As shown, in the case where it is determined that the presentation of the received notification as a contextual notification should be presented, the process 900 proceeds to operation 912; and in the case where it is determined that the presentation of the notification may not be effectuated, the process proceeds to an end.

At an operation 912, a presentation format of the contextual notification is determined. In some implementations, operation 912 may be performed by a notification control component the same as or substantially similar to the notification display component 506 described and illustrated herein At an operation 914, the presentation of the contextual notification in accordance with the format determined at operation 912 may be effectuated. In some implementations, operation 914 may be performed by a notification control component the same as or substantially similar to the notification display component 506 described and illustrated herein Implementations of the invention may be made in hardware, firmware, software, or various combinations thereof. The invention may also be implemented as instructions stored on a machine-readable medium, which may be read and executed using one or more processing devices. In one implementation, machine-readable media may include various mechanisms for storing and/or transmitting information in a form that can be read by a machine (e.g., a computing device). For example, machine-readable storage media may include read-only memory, random access memory, magnetic disk storage media, optical storage media, flash memory devices, and other media for storing information, and machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A method for generating and presenting a notification within a transportation apparatus, the method being executed by a computing device, the method comprising:
   receiving driving information regarding driving of the transportation apparatus, wherein the driving information indicates a current speed of the transportation apparatus has breached a limit;
   receiving a notification, wherein the notification indicating a communication is received by the transportation apparatus; and
   determining not to present the notification within the driving apparatus based on the current speed of the transportation apparatus has breached the limit.

2. The method of claim 1, wherein
   the driving information further includes speed, traffic, road and/or environment information related to the driving of the transportation apparatus.

3. The method of claim 1, wherein the driving information indicating the current speed has breached the limit is first driving information at a first time point, and wherein the method further comprises:
   receiving second driving information regarding driving of the transportation apparatus at a second time point, wherein the driving information indicates a current speed of the transportation apparatus has not breached the limit; and
   determining to present the notification within the driving apparatus based on the current speed of the transportation apparatus has not breached the limit.

4. The method of claim 3, wherein determining presentation of the notification comprises determining a presentation format for presenting the notification.

5. The method of claim 4, wherein the presentation format includes one or more of a font size, a font type, a font color, a blinking frequency, a volume level, and a position on a dashboard screen of the transportation apparatus for presenting the notification.

6. The method of claim 4, further comprising determining a notification type for the notification, and wherein the determination of the presentation of the notification is further based on the notification type.

7. The method of claim 6, wherein the notification type includes a driving condition type, a weather type, an infotainment type, a communication type or a reminder type.

8. The method of claim 4, further comprising effectuate graphical or audible presentation of the notification.

9. The method of claim 1, wherein the transportation apparatus is a vehicle, a vessel or an aircraft.

10. A system for generating and presenting a notification within a transportation device, the system comprising:
    a computer processor; and
    a memory device in communication with the computer processor, wherein the memory device includes sets of instructions, when executed by the computer processor, causes the computer processor to:
      receive driving information regarding driving of the transportation apparatus, wherein the driving information indicates a current speed of the transportation apparatus has breached a limit;
      receive a notification, wherein the notification indicating a communication is received by the transportation apparatus; and
      determine not to present the notification within the driving apparatus based on the current speed of the transportation apparatus has breached the limit.

11. The system of claim 10, wherein
    the driving information further includes speed, traffic, road and/or environment information related to the driving of the transportation apparatus.

12. The system of claim 10, wherein the driving information indicating the current speed has breached the limit is first driving information at a first time point, and wherein the method further comprises:
    receiving second driving information regarding driving of the transportation apparatus at a second time point, wherein the driving information indicates a current speed of the transportation apparatus has not breached the limit; and
    determining to present the notification within the driving apparatus based on the current speed of the transportation apparatus has not breached the limit.

13. The system of claim 12, wherein determining presentation of the notification comprises determining a presentation format for presenting the notification.

14. The system of claim 13, wherein the presentation format includes one or more of a font size, a font type, a font color, a blinking frequency, a volume level, and a position on a dashboard screen of the transportation apparatus for presenting the notification.

15. The system of claim 14, further comprising determining a notification type for the notification, and wherein the determination of the presentation of the notification is further based on the notification type.

16. The system of claim 15, wherein the notification type includes a driving condition type, a weather type, an infotainment type, a communication type or a reminder type.

17. The system of claim 14, wherein the processor is further configured to effectuate graphical or audible presentation of the notification.

18. The system of claim 10, wherein the transportation apparatus is a vehicle, a vessel or an aircraft.

* * * * *